United States Patent
Hsu

(10) Patent No.: US 9,924,772 B2
(45) Date of Patent: Mar. 27, 2018

(54) METHOD FOR PRODUCING A CLAMPING MEMBER OF A HAIR CLIP, THE CLAMPING MEMBER, AND A HAIR CLIP INCLUDING TWO CLAMPING MEMBERS

(71) Applicant: Shih Ling Hsu, Tainan (TW)

(72) Inventor: Shih Ling Hsu, Tainan (TW)

( * ) Notice: Subject to any disclaimer, the term of this patent is extended or adjusted under 35 U.S.C. 154(b) by 197 days.

(21) Appl. No.: 14/980,805

(22) Filed: Dec. 28, 2015

(65) Prior Publication Data

US 2017/0181518 A1    Jun. 29, 2017

(51) Int. Cl.
| | | |
|---|---|---|
| B29C 45/00 | (2006.01) | |
| A45D 8/20 | (2006.01) | |
| B29C 45/26 | (2006.01) | |
| B29C 45/33 | (2006.01) | |
| A45D 8/00 | (2006.01) | |
| B29L 31/00 | (2006.01) | |
| B29L 21/00 | (2006.01) | |

(52) U.S. Cl.
CPC ............ *A45D 8/20* (2013.01); *B29C 45/0055* (2013.01); *B29C 45/2626* (2013.01); *B29C 45/33* (2013.01); *A45D 2008/002* (2013.01); *B29L 2021/00* (2013.01); *B29L 2031/7282* (2013.01)

(58) Field of Classification Search
CPC .. B29C 45/0055; B29C 45/2626; B29C 45/33
See application file for complete search history.

(56) References Cited

U.S. PATENT DOCUMENTS

| 3,467,990 | A  | * | 9/1969 | Kutik | .................. | B29C 33/0027 15/187 |
| 3,577,843 | A  | * | 5/1971 | Kutik | .................. | B29C 45/2626 249/67 |
| 3,781,402 | A  | * | 12/1973 | Hanggi et al. | ......... | A46B 3/005 264/243 |
| 2005/0091805 | A1 | * | 5/2005 | Armela | .............. | A44B 18/0049 24/452 |
| 2014/0209117 | A1 | * | 7/2014 | Wang | ....................... | A45D 8/24 132/277 |
| 2014/0283365 | A1 | * | 9/2014 | Zhang | ................. | B81C 99/0085 29/527.1 |

* cited by examiner

*Primary Examiner* — Jill L Heitbrink

(57) ABSTRACT

A method for producing a clamping member of a hair clip includes filling a plastic material into a cavity defined by a fixed mold and a movable mold, forming a clamping member. The plastic material in rectilinear passages and grooves in the movable mold form teeth on a clamping portion of the clamping member. Then, the movable mold disengages from the fixed mold with the clamping member remaining on the movable mold. Next, the clamping member is moved away from the movable mold by a distance. The plastic material in each groove becomes an elongated section. Before the plastic material completely cures, the clamping member completely disengages from the movable mold. The elongated section of each tooth bends downwards due to gravitational force and completely cures to form a hooked section. The remaining portion of each tooth forms a rectilinear section interconnected between the hooked section and the clamping portion.

4 Claims, 10 Drawing Sheets

METHOD FOR PRODUCING A CLAMPING MEMBER OF A HAIR CLIP, THE CLAMPING MEMBER, AND A HAIR CLIP INCLUDING TWO CLAMPING MEMBERS

BACKGROUND OF THE INVENTION

The present invention relates to a method for producing a clamping member of a hair clip, the clamping member, and a hair clip including two clamping member and, more particularly, to a clamping member and a hair clip with increased anti-slipping effect.

Conventional hair clips generally include two clamping members for clamping hair. The shapes of the two clamping members can be identical or different. The two clamping members can be closed to clamp hair. FIGS. 7 and 8 show a conventional hair clip including two clamping members 1', a pin 2', and an elastic element 3'. Each of the two clamping members 1' is integrally formed from a rigid plastic material and has a Shore hardness of about 93A-105A. The two clamping members 1' have symmetric shapes. Each clamping member 1' includes a pressing portion 11' on an upper portion thereof, a clamping portion 12' on a lower end thereof, and a pivotal portion 13' on a center of an inner side thereof. The clamping portion 12' has a plurality of claws 121'. Each claw 121' has an inner face 122'. The pin 2' extends through the pivotal portions 13' of the two clamping members 1'. The spring 3' provides the two clamping members 1' with clamping elasticity, such that the two clamping members 1' can clamp hair 4' by the clamping force provided by the spring 3'.

After the two clamping members 1' have clamped the hair 4' of a user, the hair 4' is mainly clamped by the inner faces 122' of the claws 121', such that the hair clip is apt to fall when the user is exercising or shaking her head. Furthermore, the rigid claws 121' pressing the head of the user causes discomfort.

In an approach to solve the above disadvantage, as shown in FIGS. 9 and 9A, a plurality of rectilinear needles 123' is formed on the inner face 122' of each claw 121' of each clamping member 1'. The needles 123' are directly formed into rectilinear shapes after ejection of the mold (not shown) for the clamping member 1'. When the two clamping members 1' clamp the hair 4', the needles 123' can penetrate through the hair 4' to provide better anti-slipping stability than the above hair clip.

However, the needles 123' merely rectilinearly penetrate through the hair 4'; namely, the needles 123' cannot hook the hair 4', such that the hair clamping effect is still unsatisfactory. Furthermore, the needles 123' are made of a rigid material, and the tips of the needles 123' could injure the skin of a human body.

As shown in FIGS. 10 and 10A, to increase the anti-slipping effect and comfort, a soft anti-slipping plate 124' is adhered to the inner face 122' on each rigid claw 121' by an adhesive. The anti-slipping plates 124' contact the hair 4' to increase the anti-slipping effect. However, the anti-slipping plates 124' cause an increase in the costs. Furthermore, the anti-slipping plates 124' is apt to fall due to deterioration of the adhesive after the hair clip has been used for a period of time.

BRIEF SUMMARY OF THE INVENTION

An objective of the present invention is to provide a method for producing a clamping member for a hair clip, the clamping member, and a hair clip including two clamping members.

In a first aspect, a method is provided for producing a clamping member of a hair clip and includes:

a first step including preparing a fixed mold and a movable mold, with the fixed mold and the movable mold configured to be assembled to define a cavity for a clamping member of a hair clip, with the movable mold including a first mold and a second mold, with the first mold located on an inner side of the second mold and facing the fixed mold, with the first mold including an inner surface and an outer surface, with the outer surface of the first mold fixed to an inner surface of the second mold, with the first mold including a plurality of substantially rectilinear passage extending from the inner surface through the outer surface of the first mold and intercommunicated with the cavity, with the second mold including a plurality of grooves defined in the inner surface of the second mold and aligned with the plurality of substantially rectilinear passages, with each of the plurality of grooves having a diameter larger than a diameter of an outer end of each of the plurality of substantially rectilinear passages at the outer surface of the first mold;

a second step including assembling the fixed mold and the movable mold and injecting a plastic material to fill the cavity, the rectilinear passage, and the groove, forming the clamping member including a pressing portion, a clamping portion, and a pivotal portion, with the pressing portion, the clamping portion, and the pivotal portion formed by the plastic material in the cavity, with the clamping portion including a plurality of teeth, with each of the plurality of teeth formed by the plastic material in one of the plurality of substantially rectilinear passages and an associated one of the plurality of grooves, wherein the plastic material in the cavity, the plurality of substantially rectilinear passages, and the plurality of grooves is not cured;

a third step including disengaging the movable mold from the fixed mold with the clamping member remaining on the movable mold;

a fourth step including moving the clamping member away from the movable mold by a distance, with the plastic material in each of the plurality of grooves being thinned and becoming elongated due to ductility of the plastic material and, thus, having an elongated section, wherein the plastic material in the cavity, the plurality of substantially rectilinear passages, and the plurality of grooves is almost cured but not completely cured; and a fifth step including completely disengaging the clamping member from the movable mold after the fourth step has been conducted for a period of time, wherein the elongated section of each of the plurality of teeth bending downwards due to gravitational force and then completely cured to form a hooked section, wherein the remaining portion of each of the plurality of teeth forms a substantially rectilinear section interconnected between the hooked section and the clamping portion.

In an example, the clamping member is moved away from the movable mold about 2-5 mm in the fourth step.

In an example, the period of time is about 1-3 seconds in the fifth step, and the diameter of the hooked section is smaller than 2 mm.

In a second aspect, a clamping member for a hair clip is integrally made of a plastic material and includes a pressing portion on an end thereof and a clamping portion on the other end thereof. The clamping member further includes a pivotal portion on an inner side thereof. The clamping portion has an inner face. A plurality of hooked teeth extends substantially perpendicularly to the inner face of the clamping portion. Each of the plurality of hooked teeth includes a lower end having a substantially rectilinear section connected to the inner face of the clamping portion. Each of the plurality of hooked teeth further includes a top end having a hooked section which is curved relative to the substantially rectilinear section.

The clamping member can have a Shore hardness of about 58A-76A.

In a third aspect, a hair clip includes two clamping members disposed opposite to each other. Each of the two clamping members is integrally made of a plastic material and includes a pressing portion on an end thereof and a clamping portion on the other end thereof. Each of the two clamping members further includes a pivotal portion on an inner side thereof. The clamping portion of each of the two clamping members has an inner face. A plurality of hooked teeth extends substantially perpendicularly to the inner face of the clamping portion of each of the two clamping members. Each of the plurality of hooked teeth includes a lower end having a substantially rectilinear section connected to the inner face of the clamping portion. Each of the plurality of hooked teeth further includes a top end having a hooked section which is curved relative to the substantially rectilinear section. The pivotal portions of the two clamping members are pivotably connected to each other. The hair clip further includes an elastic element providing the two clamping members with a clamping force.

When the hair clip according to the present invention clamps hair of a user, the clamping portions of the two clamping members cover the hair, and the substantially rectilinear sections of the hooked teeth penetrate through the hair. The hooked sections of the hooked teeth hook the hair in a direction different from the substantially rectilinear sections to provide better hair clamping stability while preventing the hair clip from becoming loosened while the user is moving or exercising. Furthermore, the clamping member according to the present invention can use a material softer than the material for conventional hair clips to increase the comfort while using the hair clip. Furthermore, the direction of the edges of the hooked sections of the hooked teeth according the present invention is not perpendicular to the inner face of the clamping portion, preventing the hand of the user from directly contacting with the edges of the hooked section, providing enhanced use safety.

The present invention will become clearer in light of the following detailed description of illustrative embodiments of this invention described in connection with the drawings.

DESCRIPTION OF THE DRAWINGS

FIG. 1A is an enlarged view of a circled portion of FIG. 1.

FIG. 4A is an enlarged view of a circled portion of FIG. 4.

FIG. 9A is an enlarged view of a circled portion of FIG. 9.

FIG. 10A is an enlarged view of a circled portion of FIG. 10.

DETAILED DESCRIPTION OF THE INVENTION

It is noted that like reference numbers designate like elements in the examples of the present invention.

Figure 1:
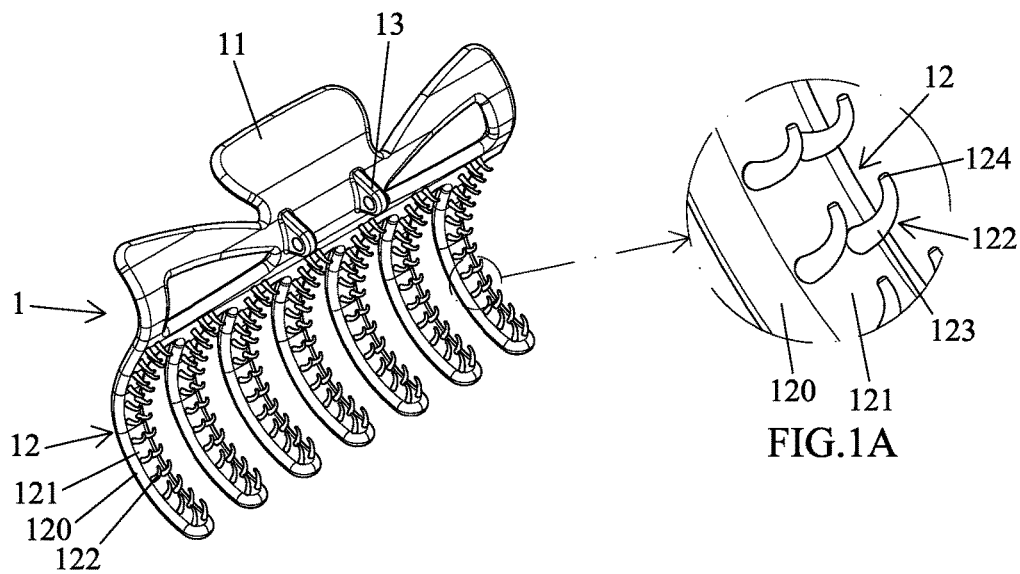
FIG. 1 is a perspective view of a clamping member of a first example according to the present invention.

FIG. 1 shows a clamping member 1 for a hair clip of a first example according to the present invention. The clamping member 1 is integrally made of a plastic material and includes a pressing portion 11 on an end thereof and a clamping portion 12 on the other end thereof. The clamping portion 12 includes a plurality of claws 120 on a lower end thereof. The clamping member 1 further includes a pivotal portion 13 on an inner side thereof. The clamping portion 12 has an inner face 121. A plurality of hooked teeth 122 extends substantially perpendicularly to the inner face 121 of the clamping portion 12. Each hooked tooth 122 includes a lower end having a substantially rectilinear section 123 connected to the inner face 121 of the clamping portion 12. Each hooked tooth 122 further includes a top end having a hooked section 124 which is curved relative to the substantially rectilinear section 123.

FIGS. 2A-2E show an example of a method for producing a clamping member 1 of a hair clip according to the present invention.

Figure 2A:
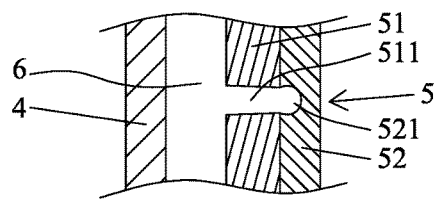
FIG. 2A to FIG. 2E show steps for producing a hooked tooth of the clamping member of the first example.

With reference to FIG. 2A, the method includes a first step S1 including preparing a fixed mold 4 and a movable mold 5. The fixed mold 4 and the movable mold 5 are configured to be assembled together to define a cavity 6 for a clamping member 1 of a hair clip. The movable mold 5 includes a first mold 51 and a second mold 52. The first mold 51 is located on an inner side of the second mold 52 and faces the fixed mold 4. The first mold 51 includes an inner surface and an outer surface. The outer surface of the first mold 51 is fixed to an inner surface of the second mold 52. The first mold 51 includes a plurality of substantially rectilinear passages 511 extending from the inner surface through the outer surface of the first mold 51 and intercommunicated with the cavity 6. The second mold 52 includes a plurality of grooves 521 defined in the inner surface of the second mold 52 and aligned with the substantially rectilinear passages 511. Each groove 521 has a diameter larger than a diameter of an outer end of each substantially rectilinear passage 511 at the outer surface of the first mold 51. FIG. 2A shows one of the substantially rectilinear passages 511 and one of the grooves 521.

Figure 2B:
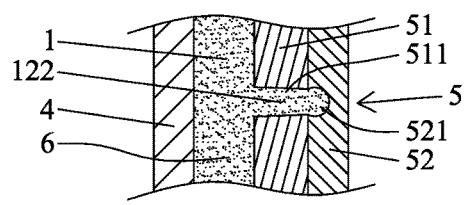

With reference to FIG. 2B, the method further includes a second step S2 including assembling the fixed mold 4 and the movable mold 5 together and injecting a plastic material to fill the cavity 6, the substantially rectilinear passages 511, and the grooves 521, forming the clamping member 1. The pressing portion 11, the clamping portion 12, and the pivotal portion 1 are formed by the plastic material in the cavity 6. The clamping portion 12 includes a plurality of teeth 122. Each tooth 122 is formed by the plastic material in one of the substantially rectilinear passages 511 and an associated one of the grooves 521. It can be appreciated that the plastic material in the cavity 6, the substantially rectilinear passages 511, and the grooves 521 is not cured in the second step S2. The plastic material can have a Shore hardness of about 58A-76A after curing. The fixed mold 4 and the movable mold 5 can be placed on an injection molding machine for proceeding with injection of the plastic material.

Figure 2C:
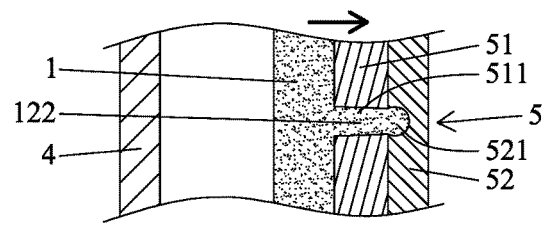

With reference to FIG. 2C, the method further includes a third step S3 including disengaging the movable mold 5 from the fixed mold 4 with the clamping member 1 remaining on the movable mold 5.

Figure 2D:
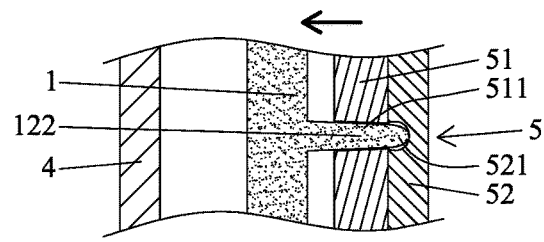

With reference to FIG. 2D, the method further includes a fourth step S4 including moving the clamping member 1 away from the movable mold 5 by a distance, such as by using an ejection device (not shown) or any suitable mechanism. The clamping member 1 can be moved away from the movable mold 5 about 2-5 mm. The plastic material in each groove 521 is thinned and becomes elongated due to ductility of the plastic material and, thus, has an elongated section. The diameter of the elongated section can be smaller than 2 mm. It can be appreciated that the plastic material in the cavity 6, the substantially rectilinear passages 511, and the grooves 521 is almost cured but not completely cured in the fourth step S4.

Figure 2E:
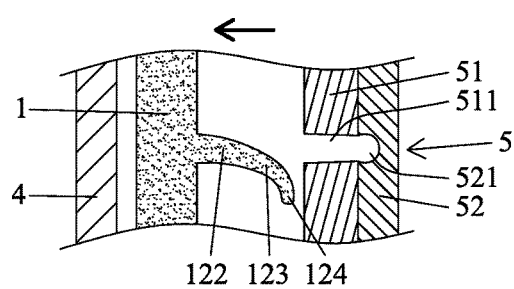

With reference to FIG. 2E, the method further includes a fifth step S5 including completely disengaging the clamping member 1 from the movable mold 5 after the fourth step S4 has been conducted for a period of time (such as about 1-3 seconds). The elongated section of each tooth 122 bends downwards due to the gravitational force and then cures to form a hooked section 124. The remaining portion of each tooth 122 forms a substantially rectilinear section 123 interconnected between the hooked section 124 and the clamping portion 12. Thus, each tooth 122 becomes hooked. In the fifth step S5, the plastic material in the fourth step S4 can elongate to a predetermined length after a predetermined period of time to permit the elongated length takes shape. Thus, when the clamping member 1 disengages from the movable board 5 and moves to the elongated position, each tooth 122 bends and then cures to take shape.

If conducted in a manner different from the fifth step S5, e.g., if the clamping member 1 directly and completely disengages from the movable mold 5, the plastic material in each groove 521 will extend to an extremely thin, elongated, filament-like shape which is apt to break. Furthermore, a portion of the plastic material could remain in each groove 521 and could hinder the next injection molding process. Thus, the fifth step S5 can assure the product quality and manufacturing stability.

Figure 3:
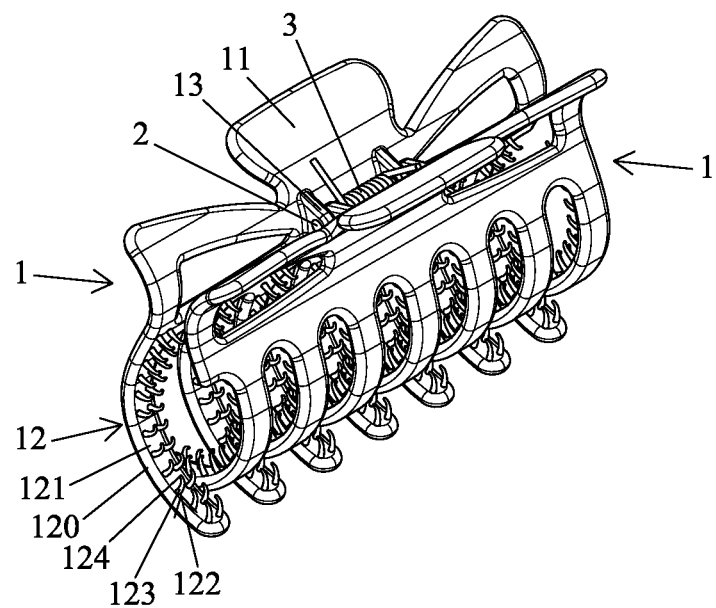
FIG. 3 is a perspective view of a hair clip including two clamping members of the first example.

FIG. 3 shows a hair clip including two clamping members 1 disposed opposite to each other. The pivotal portions 13 of the two clamping members 1 are pivotally connected to each other by a pin 2. The hair clip further includes an elastic element 3 in the form of a torsion spring providing the two clamping members 1 with a clamping force.

Figure 4:
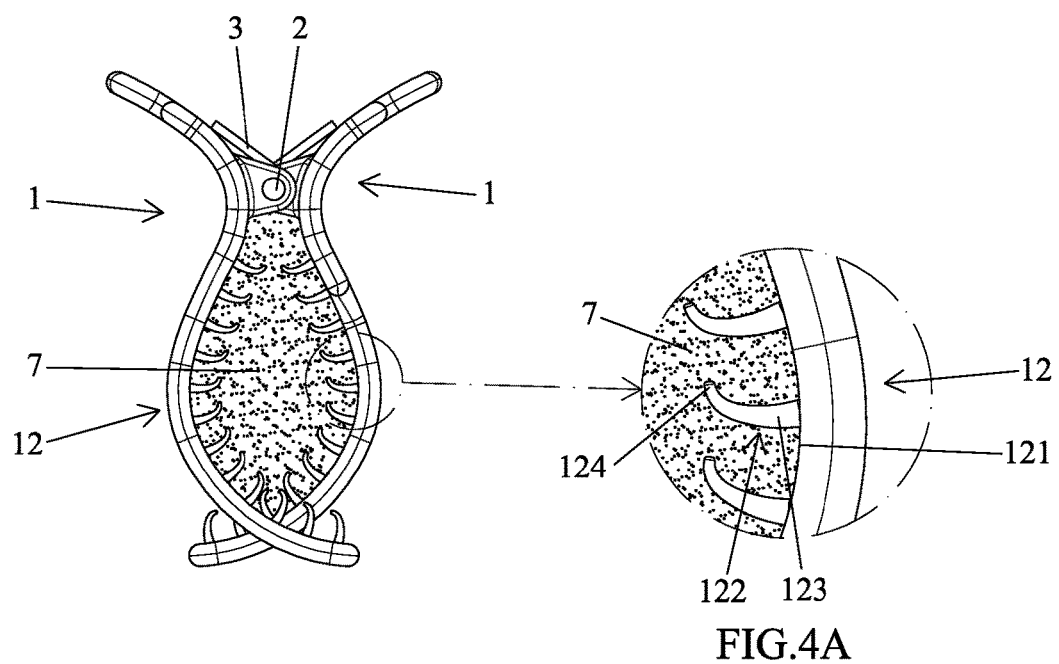
FIG. 4 is a schematic side view illustrating hair clamping by the hair clip of FIG. 3.

With reference to FIG. 4, when the hair clip clamps hair 7 of a user, the clamping portions 12 of the two clamping members 1 cover the hair 7, and the substantially rectilinear sections 123 of the hooked teeth 122 penetrate through the hair 7. The hooked sections 124 of the hooked teeth 122 hook the hair 7 in a direction different from the substantially rectilinear sections 123 to provide better hair clamping stability while preventing the hair clip from becoming loosened while the user is moving or exercising. Furthermore, the clamping member 1 according to the present invention can use a material softer than the material for conventional hair clips to increase the comfort while using the hair clip. Furthermore, the direction of the edges of the hooked sections 124 of the hooked teeth 122 according the present invention is not perpendicular to the inner face 121 of the clamping portion 12, preventing the hand of the user from directly contacting with the edges of the hooked section 124, providing enhanced use safety.

Figure 5:
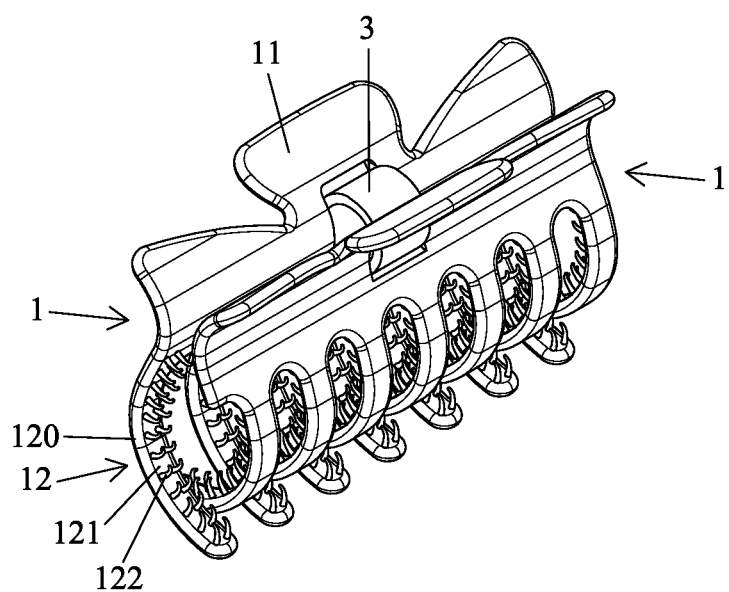
FIG. 5 is a perspective view of a hair clip of a second example according to the present invention.
Figure 6:
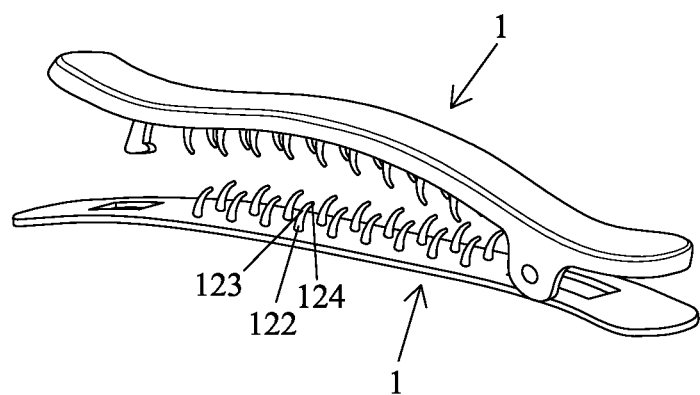
FIG. 6 is a perspective view of a hair clip of a third example according to the present invention.
Figure 7:
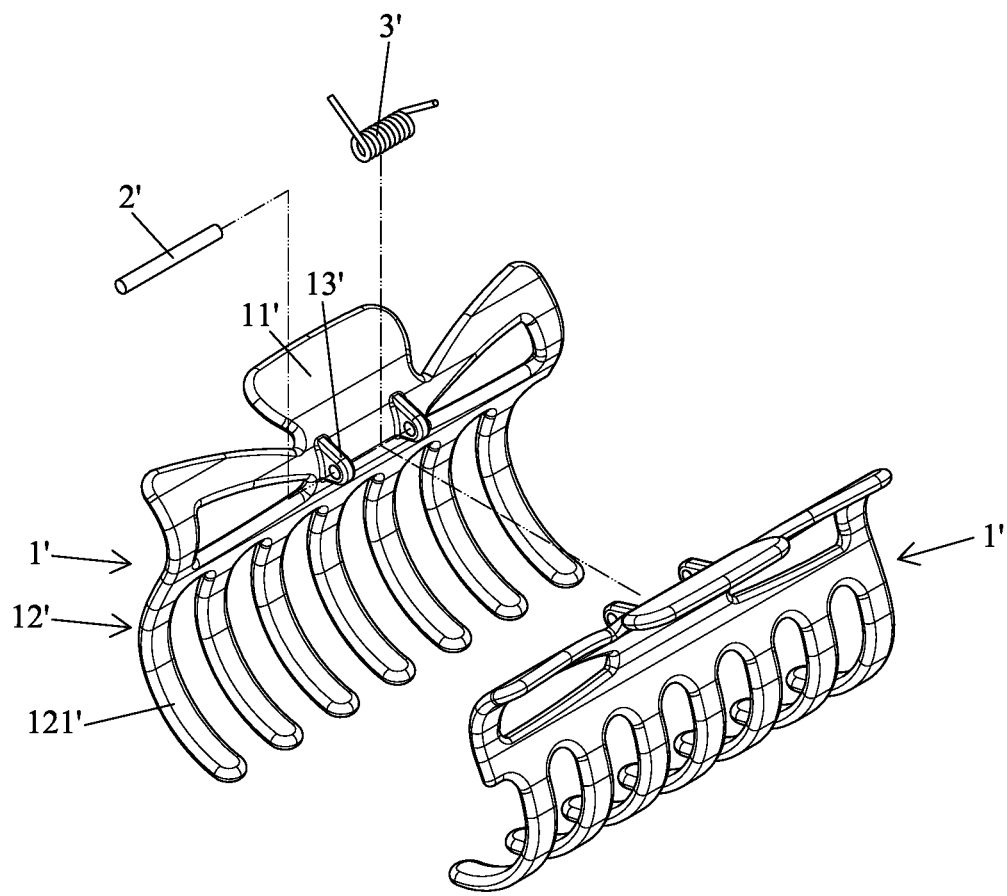
FIG. 7 is an exploded, perspective view of a conventional hair clip.
Figure 8:
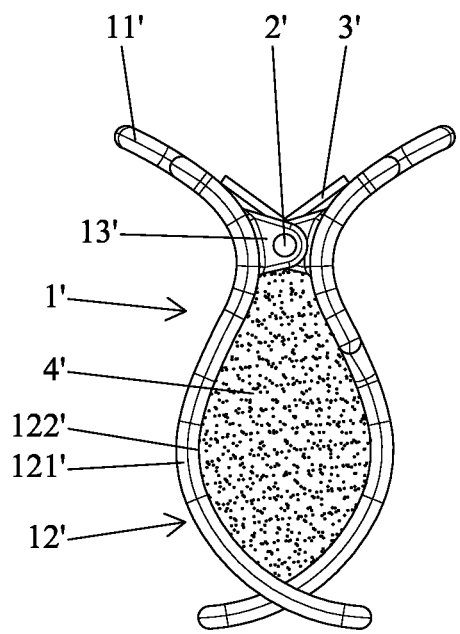
FIG. 8 is a schematic side view illustrating hair clamping by the hair clip of FIG. 7.
Figure 9:
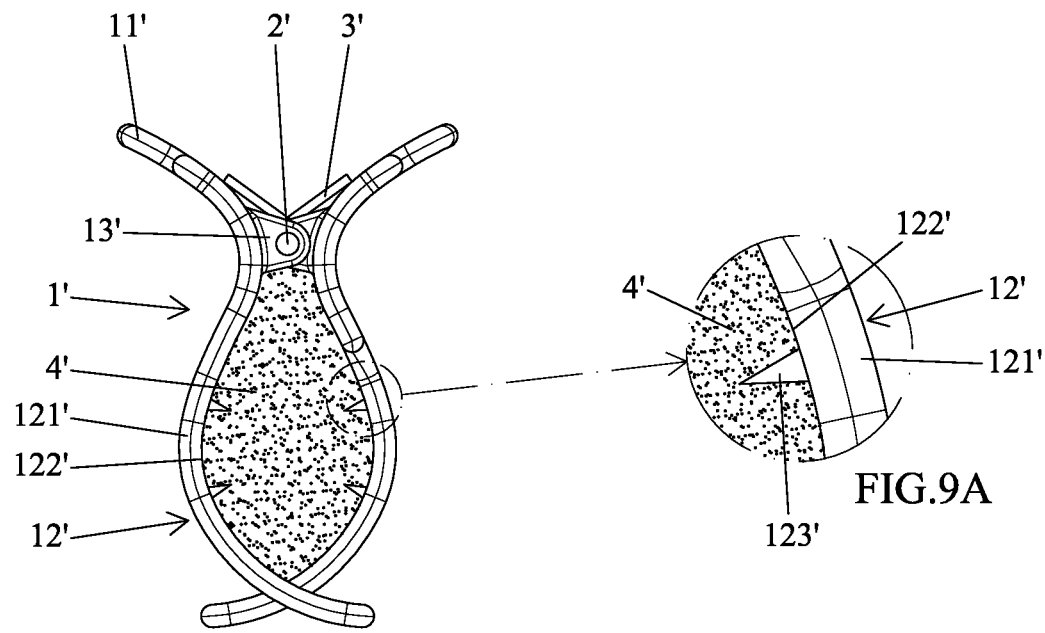
FIG. 9 is a schematic side view illustrating hair clamping by another conventional hair clip.
Figure 10:
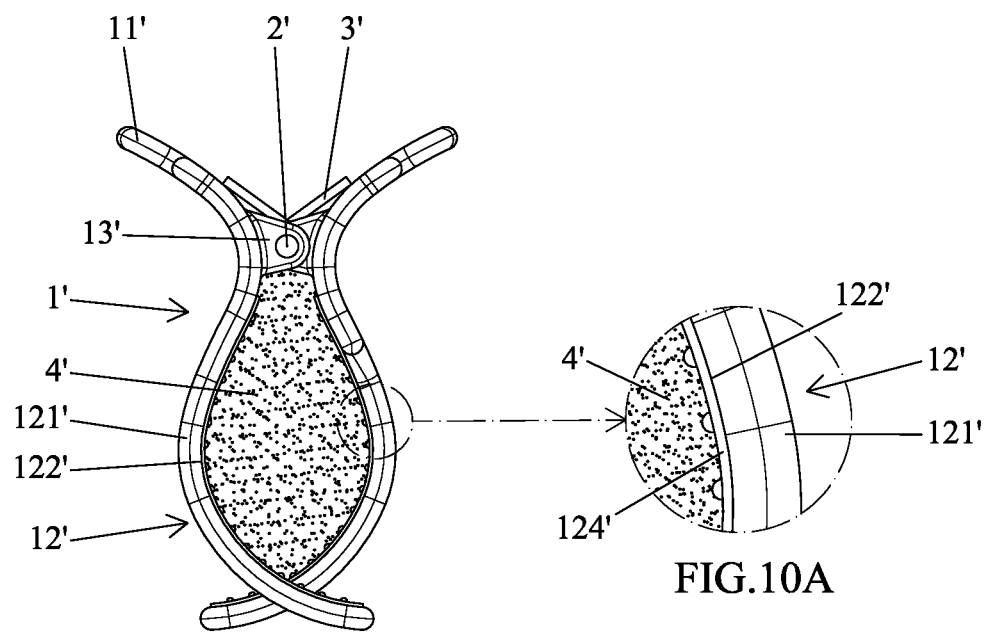
FIG. 10 is a schematic side view illustrating hair clamping by a further conventional hair clip.

The hair clip according to the present invention can have different types. FIG. 5 shows a second example of the present invention which is substantially the same as the first example except that the elastic element 3 is made of plastic and is formed on the outer sides of the two clamping members 1. FIG. 6 shows a third example of the present invention which is substantially the same as the first example except that the two clamping members 1 of the third example have shapes different from the shapes of the first example and do not include claws and the elastic element.

Furthermore, the hooked teeth 122 can be provided on only one of the clamping members 1 of the hair clip whereas the other clamping member 1 is free of hooked teeth 122.

Although specific embodiments have been illustrated and described, numerous modifications and variations are still possible without departing from the scope of the invention. The scope of the invention is limited by the accompanying claims.

The invention claimed is:

1. A method for producing a clamping member of a hair clip, comprising:
   a first step including preparing a fixed mold and a movable mold, with the fixed mold and the movable mold configured to be assembled to define a cavity for a clamping member of a hair clip, with the movable mold including a first mold and a second mold, with the first mold located on an inner side of the second mold and facing the fixed mold, with the first mold including an inner surface and an outer surface, with the outer surface of the first mold fixed to an inner surface of the second mold, with the first mold including a plurality of substantially rectilinear passage extending from the inner surface through the outer surface of the first mold and intercommunicated with the cavity, with the second mold including a plurality of grooves defined in the inner surface of the second mold and aligned with the plurality of substantially rectilinear passages, with each of the plurality of grooves having a diameter larger than a diameter of an outer end of each of the plurality of substantially rectilinear passages at the outer surface of the first mold;
   a second step including assembling the fixed mold and the movable mold and injecting a plastic material to fill the cavity, the rectilinear passage, and the groove, forming the clamping member including a pressing portion, a clamping portion, and a pivotal portion, with the pressing portion, the clamping portion, and the pivotal portion formed by the plastic material in the cavity, with the clamping portion including a plurality of teeth, with each of the plurality of teeth formed by the plastic material in one of the plurality of substantially rectilinear passages and an associated one of the plurality of grooves, wherein the plastic material in the cavity, the plurality of substantially rectilinear passages, and the plurality of grooves is not cured;
   a third step including disengaging the movable mold from the fixed mold with the clamping member remaining on the movable mold;
   a fourth step including moving the clamping member away from the movable mold by a distance, with the plastic material in each of the plurality of grooves being thinned and becoming elongated due to ductility of the plastic material and, thus, having an elongated section, wherein the plastic material in the cavity, the plurality of substantially rectilinear passages, and the plurality of grooves is almost cured but not completely cured; and a fifth step including completely disengaging the clamping member from the movable mold after the fourth step has been conducted for a period of time, wherein the elongated section of each of the plurality of teeth bending downwards due to gravitational force and then completely cured to form a hooked section, wherein a remaining portion of each of the plurality of teeth forms a substantially rectilinear section interconnected between the hooked section and the clamping portion.

2. The method for producing a clamping member of a hair clip as claimed in claim 1, wherein the plastic material has a Shore hardness of about 58A-76A.

3. The method for producing a clamping member of a hair clip as claimed in claim 1, wherein clamping member is moved away from the movable mold about 2-5 mm in the fourth step.

4. The method for producing a clamping member of a hair clip as claimed in claim 1, wherein the period of time is about 1-3 seconds in the fifth step, and the diameter of the hooked section is smaller than 2 mm.

\* \* \* \* \*